United States Patent
Fouda et al.

(10) Patent No.: US 11,181,659 B2
(45) Date of Patent: Nov. 23, 2021

(54) PIPE THICKNESS INVERSION USING A FAST FORWARD MODEL

(71) Applicant: Halliburton Energy Services, Inc., Houston, TX (US)

(72) Inventors: Ahmed Elsayed Fouda, Spring, TX (US); Baris Guner, Houston, TX (US); Junwen Dai, Singapore (SI); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 130 days.

(21) Appl. No.: 16/606,691

(22) PCT Filed: Nov. 27, 2018

(86) PCT No.: PCT/US2018/062646
§ 371 (c)(1),
(2) Date: Oct. 18, 2019

(87) PCT Pub. No.: WO2020/112091
PCT Pub. Date: Jun. 4, 2020

(65) Prior Publication Data
US 2020/0200940 A1    Jun. 25, 2020

(51) Int. Cl.
*G01V 3/28* (2006.01)
*E21B 47/00* (2012.01)

(52) U.S. Cl.
CPC .............. *G01V 3/28* (2013.01); *E21B 47/00* (2013.01)

(58) Field of Classification Search
CPC ....... E21B 47/00; E21B 47/006; E21B 47/085
See application file for complete search history.

(56) References Cited

U.S. PATENT DOCUMENTS

| 9,715,034 B2 | 7/2017 | Omeragic et al. |
| 2005/0256642 A1* | 11/2005 | Barber ..................... G01V 3/38 702/6 |

(Continued)

FOREIGN PATENT DOCUMENTS

| WO | 2017048263 | 3/2017 |
| WO | 2018031036 | 2/2018 |

(Continued)

OTHER PUBLICATIONS

International Search Report and Written Opinion for PCT/US2018/062646 dated Aug. 20, 2019.

(Continued)

*Primary Examiner* — Alvaro E Fortich
(74) *Attorney, Agent, or Firm* — John Wustenberg; C. Tumey Law Group PLLC

(57) ABSTRACT

A method and a system for estimating a pipe property for a plurality of nested pipes. The method may comprise determining the pipe property from the plurality of measurements, wherein the pipe property identifies a feature in the wellbore, forming a pre-computed table of responses for the at least one channel comprising a plurality of points that sample the pipe property, and performing a model-based inversion to estimate the pipe property using the plurality of measurements, the nominal properties of the pipes, and a fast forward model based on the pre-computed table of responses. A system may comprise an electromagnetic logging tool and an information handling system. The electromagnetic logging tool may comprise a transmitter, wherein the transmitter is a first coil and is operable to transmit an electromagnetic field, and a receiver, wherein the receiver and is operable to measure the electromagnetic field.

20 Claims, 7 Drawing Sheets

(56) References Cited

U.S. PATENT DOCUMENTS

| | | | |
|---|---|---|---|
| 2015/0338541 A1 | 11/2015 | Nichols et al. | |
| 2015/0369937 A1* | 12/2015 | Bergey | G01V 1/306 702/11 |
| 2016/0109605 A1* | 4/2016 | Bose | G01V 1/50 367/35 |
| 2016/0245779 A1 | 8/2016 | Khalaj Amineh et al. | |
| 2017/0191361 A1* | 7/2017 | Khalaj Amineh | G01V 3/30 |
| 2017/0261469 A1 | 9/2017 | Chang et al. | |
| 2018/0106763 A1 | 4/2018 | Fouda et al. | |
| 2018/0172872 A1* | 6/2018 | Fouda | E21B 47/092 |

FOREIGN PATENT DOCUMENTS

| | | |
|---|---|---|
| WO | 2018031047 | 2/2018 |
| WO | 2018084865 | 5/2018 |
| WO | 2019094209 | 5/2018 |
| WO | 2019094202 | 5/2019 |

OTHER PUBLICATIONS

D. Abdallah, M. Fahim, K. Al-Hendi, M. Al-Muhailan, etc, "Casing Corrosion Measurement to Extend Asset Life", 2013.

\* cited by examiner

PIPE THICKNESS INVERSION USING A FAST FORWARD MODEL

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying artifacts with an electromagnetic logging tool in an eccentric pipe configuration comprising a plurality of pipes. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tools may include an independent power supply and may store the acquired data on memory. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe stings, the received signal may be a non-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point.

Figure 1:
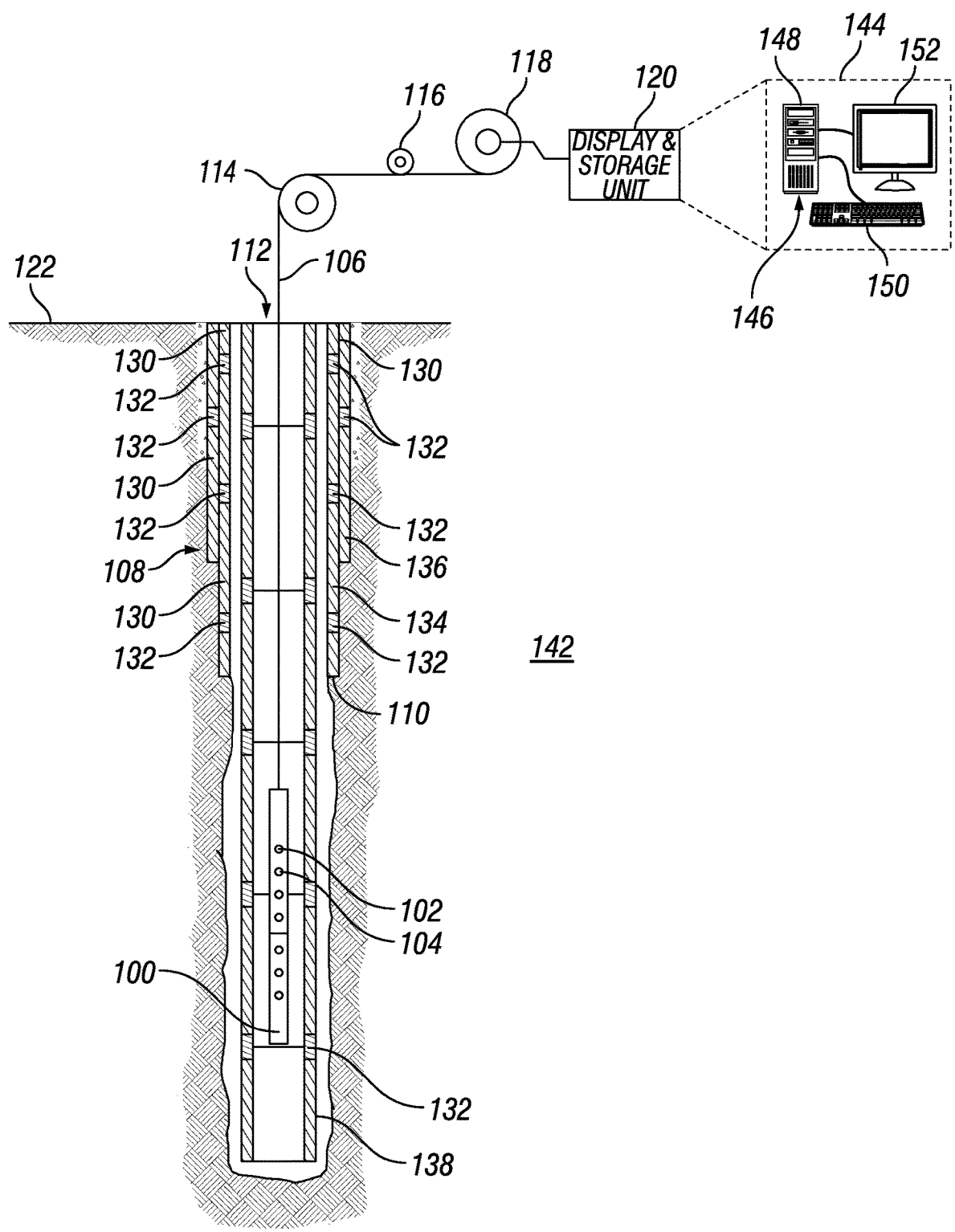
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may broadcast electromagnetic fields into subterranean formation 142. It should be noted that broadcasting electromagnetic fields may also be referred to as transmitting electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by the transmitter 102 and the sensing and/or measuring of secondary electromagnetic fields by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on the EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\, t \qquad (1)$$

and the magnitude of the impedance shows the dependence:

$$\exp[-2(\sqrt{\omega\mu\sigma/2})t] \qquad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \simeq 2\frac{t}{\delta} \qquad (4)$$

and the magnitude of the impedance shows the dependence:

$$\exp[-2t/\delta] \qquad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
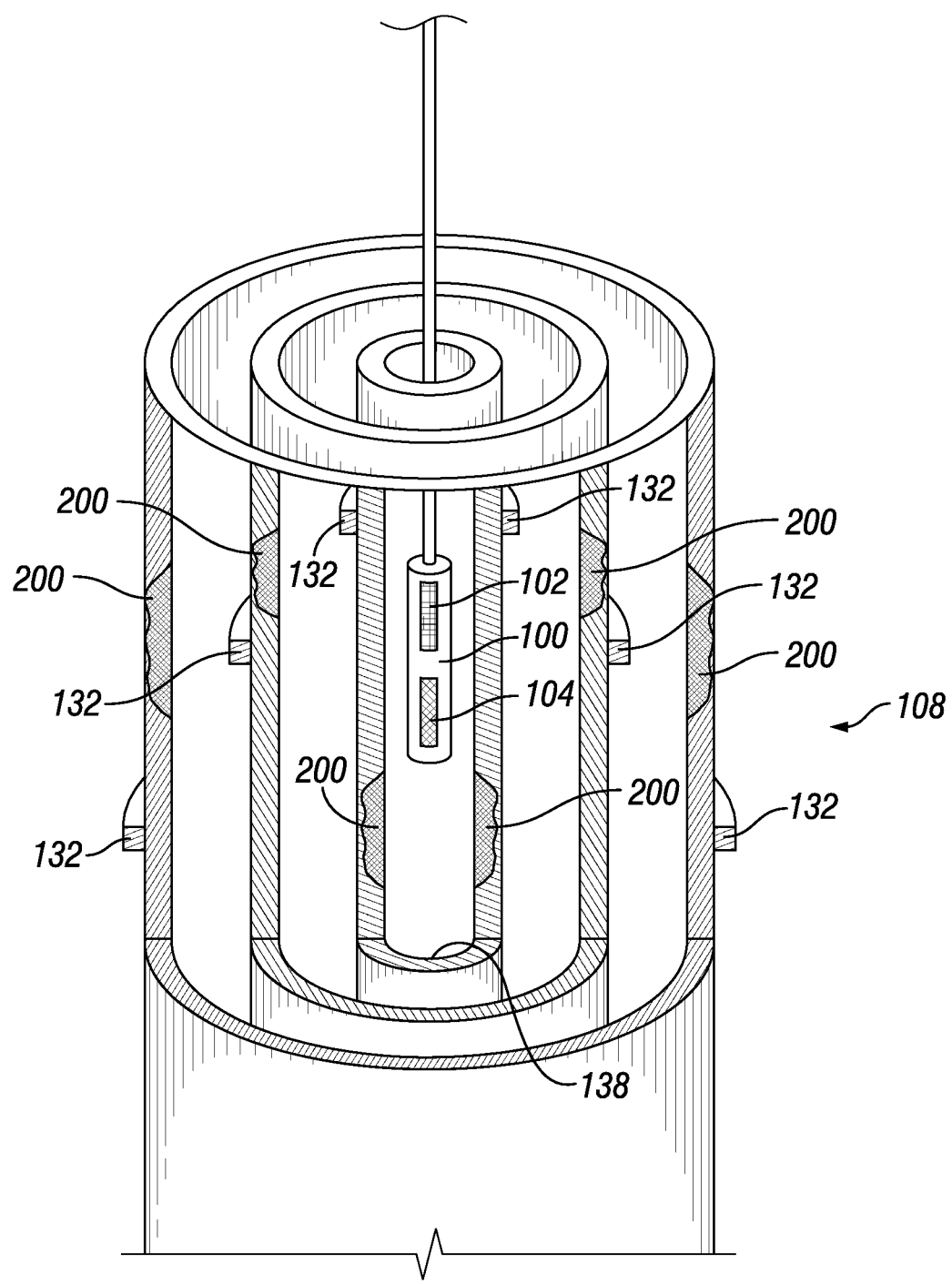
FIG. 2 illustrates an example of arbitrary defects within multiple pipes.
Figure 3A:
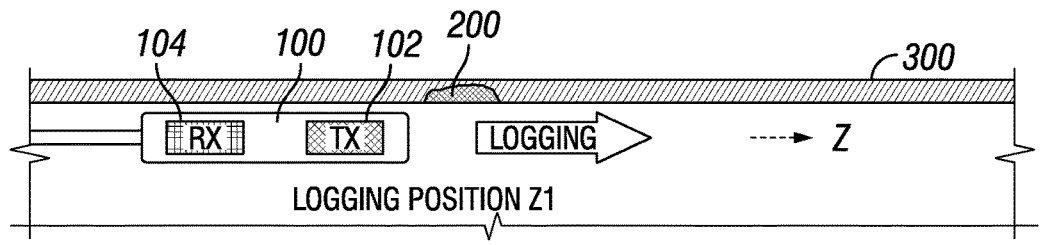
FIG. 3A illustrates an example of an EM logging tool traversing a wellbore.
Figure 3B:
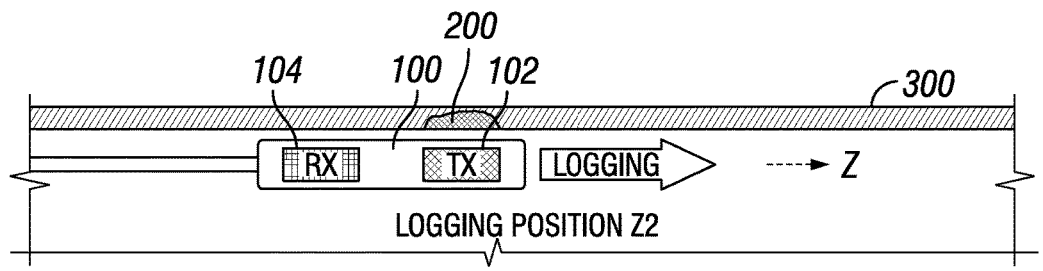
FIG. 3B illustrates another example of an EM logging tool traversing a wellbore.
Figure 3C:
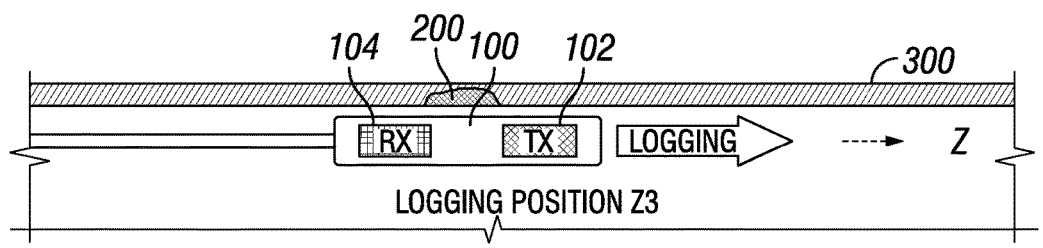
FIG. 3C illustrates another example of an EM logging tool traversing a wellbore.
Figure 3D:
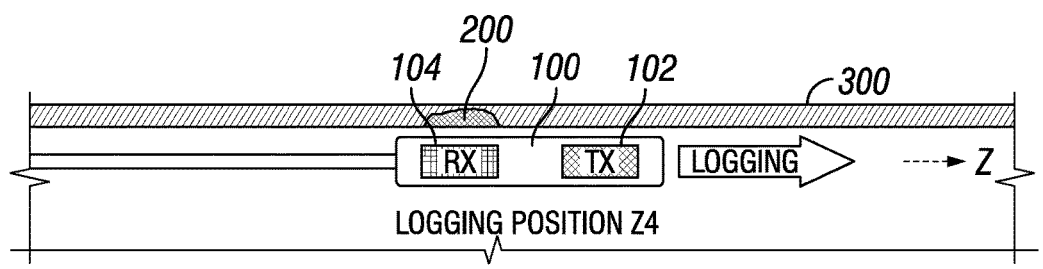
FIG. 3D illustrates another example of an EM logging tool traversing a wellbore.
Figure 3E:
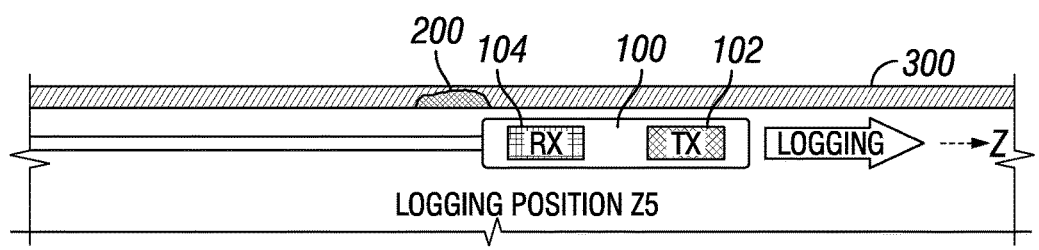
FIG. 3E illustrates another example of an EM logging tool traversing a wellbore.

FIG. 2 shows EM logging tool 100 disposed in pipe string 138 which may be surrounded by a plurality of nested pipes (i.e. first casing 134 and second casing 136) and an illustration of anomalies 200 disposed within the plurality of nested pipes. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet). Due to these complications, methods may need to be used to accurately inspect pipe features.

FIGS. 3a-3e illustrates an electromagnetic inspection and detection of anomalies 200 (i.e. defects) or collars 132 (e.g., Referring to FIG. 2). As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing and frequencies may be used. For example, short spaced transmitters 102 and receivers 104 may be sensitive to pipe string 138, while long spaced transmitters 102 and receivers 104 may be sensitive to deeper pipes (i.e. first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., Referring to FIG. 1 and FIG. 2) may generate an electrical signal that may be in the opposite polarity to the incident signal and results in a reduction in the received signal. Generally, as metal volume increase the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing and frequencies may be used. For example, short spaced transmitters 102 and receivers 104 may be sensitive to first pipe string 138 (e.g., Referring to FIG. 2), while long spaced transmitters 102 and receivers 104 can be sensitive to deeper ($2^{nd}$, $3^{rd}$, etc.) pipes (i.e. first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) Spatial spread of long spaced transmitter-receiver signal for a collar 132 may be long (up to 6 feet); (4) To accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example in examples with more than two pipes may be present in pipe string 138.

As EM logging tool 100 traverses across pipe 300 (e.g., Referring to FIG. 3), An EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

A calibrated log may then be inserted into an inversion scheme that may solve for a set of pipe parameters, including but not limited to, the individual thickness of each pipe, percentage metal loss or gain, the individual mu and/or sigma of each pipe, the total thickness of each pipe, the eccentricity of each pipe, and the inner diameter of each pipe. An inversion scheme operates by identifying the most likely set of pipe parameters and adjusting them until a cost function may be minimized. The underlying optimization algorithm of the inversion scheme may be any one of the commonly-used algorithms, including but not limited to, the steepest descent, conjugate gradient, Gauss-Newton, Levenberg-Marquardt, and/or Nelder-Mead. Although the preceding examples may be conventional iterative algorithms, global approaches such as evolutionary and particle-swarm based algorithms may also be used. In examples, the cost function may be minimized using a linear search over a search vector rather than a sophisticated iterative or global optimization. The linear search, as mentioned earlier, has the advantage of being readily parallelizable, which may be advantageous as the cost of cloud computing decreases in the marketplace.

An example of the inversion cost function that may use the calibrated measurements is given below:

$$F(x) = \frac{1}{2M} \left\| W_{m,abs} \times \left( \frac{|\hat{m}| - |s(x)|}{|s(x)|} \right) \right\|_2^2 + \quad (6)$$

$$\frac{1}{2M} \left\| W_{m,angle} \times \text{angle} \left\{ \frac{\hat{m}}{s(x)} \right\} \right\|_2^2 + |W_x \times (x - x_{nom})|_1$$

Where $\hat{m}$: vector of M complex-valued calibrated measurements such that $\hat{m}_{nom} = s_{nom}$. Additionally, $\hat{m}$ is a function of m that may be expanded as follows $$\hat{m} = a_0 + a_1 \times m + a_2 \times m^2 + \ldots \quad (7)$$

where $a_0$, $a_1$, $a_2$, ... are calibration coefficients.

The cost function of Equation (1) may include three terms: the magnitude misfit, the phase misfit, and the regularization that is used to eliminate spurious non-physical solutions of the inversion problem. In examples, real and imaginary parts of the measurement and phase may also be used in the cost function. Many other norms (other than the 2-norm and 1-norm above) may also be used. Trivial interchanges of the measured and synthetic responses in the denominator terms may also possible.

In examples, calibration becomes unnecessary by using a self-calibrated inversion cost function given below:

$$F(x) = \frac{1}{2M} \left\| W_{m,abs} \times \left( \frac{|m| - |m_{nom}|}{|m_{nom}|} - \frac{|s(x)| - |s_{nom}|}{|s_{nom}|} \right) \right\|_2^2 + \frac{1}{2M} \quad (8)$$

$$\left\| W_{m,angle} \times \left( \text{angle} \left\{ \frac{m}{m_{nom}} \right\} - \text{angle} \left\{ \frac{s(x)}{s_{nom}} \right\} \right) \right\|_2^2 + |W_x \times (x - x_{nom})|_1$$

where x is defined as vector of N unknowns (model parameters), for example:

$$x = [t_1, \ldots, t_{N_p}, \mu_1, \ldots, \mu_{N_p}, \sigma_1, \ldots, \sigma_{N_p}, \ldots], N_p \quad (9)$$

is the number of pipes. In examples, m is defined as a vector of M complex-valued measurements at different frequencies and receivers, as seen below:

$$M = N_{Rx} \times N_f \quad (10)$$

where $N_{Rx}$ is the number of receivers and $N_f$ is the number of frequencies. In examples, $m_{nom}$ is defined as a vector of M complex-valued nominal measurements. These may be computed as the signal levels of highest probability of occurrence within a given zone. In examples, s(x) is defined as a vector of M forward model responses. $s_{nom}$ is defined as a vector of M complex-valued forward model responses corresponding to the nominal properties of the pipes. Further, $W_{m,abs}$, $W_{m,angle}$ is defined as a measurements magnitude and phase weight matrices, for example M×M, diagonal matrices used to assign different weights to different measurements based on the relative quality or importance of each measurement. In examples, $W_x$ is defined as N×N diagonal matrix of regularization weights. $x_{nom}$ is defined as a vector of nominal model parameters and for N-dimensional vector y shown below:

$$\|y\|_2^2 = \Sigma_{i=1}^N |y_i|^2 \quad (11)$$

and $$|y|_1 = \Sigma_{i=1}^N |y_i| \quad (12)$$

It should be noted that division $$\frac{s(x)}{s} \quad (13)$$

is element-wise division.

The type of cost function in Equation (3) may be independent of the calibration as long as it is multiplicative. Therefore, the calibration step becomes unnecessary if Equation (3) may be used as the cost function in inversion.

The forward model response of a given channel can be written using the Taylor series expansion as follows $$s(x) = s(x_{nom}) + \frac{\partial s}{\partial x_1}\bigg|_{x_{nom}} (x_1 - x_{1,nom}) + \ldots + \frac{\partial s}{\partial x_N}\bigg|_{x_{nom}} \quad (14)$$

$$(x_N - x_{N,nom}) + \frac{1}{2!} \frac{\partial^2 s}{\partial x_1^2}\bigg|_{x_{nom}} (x_1 - x_{1,nom})^2 + \ldots + \frac{1}{2!} \frac{\partial^2 s}{\partial x_N^2}\bigg|_{x_{nom}}$$

$$(x_N - x_{N,nom})^2 + \frac{1}{3!} \frac{\partial^3 s}{\partial x_1^3}\bigg|_{x_{nom}} (x_1 - x_{1,nom})^3 + \ldots + \frac{1}{3!} \frac{\partial^3 s}{\partial x_N^3}\bigg|_{x_{nom}}$$

$$(x_N - x_{N,nom})^3 + \ldots + \frac{1}{2!} \sum_{i=1}^{N} \sum_{j=1; i \neq j}^{N} \frac{\partial^2 s}{\partial x_i \partial x_j}\bigg|_{x_{nom}}$$

$$(x_i - x_{j,nom})(x_j - x_{j,nom}) + \frac{1}{3!} \sum_{i=1}^{N} \sum_{j=1}^{N} \sum_{k=1; i \neq j \neq k}^{N} \frac{\partial^3 s}{\partial x_i \partial x_j \partial x_k}\bigg|_{x_{nom}}$$

$$(x_i - x_{j,nom})(x_j - x_{j,nom})(x_k - x_{k,nom}) + \ldots \text{ but}$$

$$\frac{\partial s}{\partial x_i}\bigg|_{x_{nom}} (x_i - x_{i,nom}) + \frac{1}{2!} \frac{\partial^2 s}{\partial x_i^2}\bigg|_{x_{nom}} (x_i - x_{i,nom})^2 + \frac{1}{3!} \frac{\partial^3 s}{\partial x_i^3}\bigg|_{x_{nom}} \quad (15)$$

$$(x_i - x_{i,nom})^3 + \ldots = s(x_i) - s(x_{nom}) \text{ where}$$

$$x_i(j) = \begin{cases} x_{nom}(j), & j \neq i \\ x_i, & j = i \end{cases} \quad (16)$$

In the terms containing derivative of only one variable are considered, the forward model response s(x) may be written as $$s(x) = \Sigma_{i=2}^N s(x_i) - (N-1) \times s(x_{nom}) + e_1 \quad (17)$$

where $e_1$ represents the sum of higher-order mixed derivatives. To obtain higher accuracy, the terms containing the mixed-derivatives of two different variables like $x_i$ and $x_j$ can be further considered.

Similarly, for the variable $x_j$ $$\frac{\partial s}{\partial x_j}\bigg|_{x_{nom}}(x_j - x_{j,nom}) + \frac{1}{2!}\frac{\partial^2 s}{\partial x_j^2}\bigg|_{x_{nom}}(x_j - x_{j,nom})^2 + \frac{1}{3!}\frac{\partial^3 s}{\partial x_j^3}\bigg|_{x_{nom}} \quad (18)$$

$$(x_j - x_{j,nom})^3 + \ldots = s(x_j) - s(x_{nom}) \text{ where}$$

$$x_j(k) = \begin{cases} x_{nom}(k), k \neq j \\ x_j, k = j \end{cases} \quad (19)$$

Additionally, the terms containing the mixed-derivatives of two different variables satisfy $$\frac{1}{2!}\frac{\partial^2 s}{\partial x_i \partial x_j}\bigg|_{x_{nom}}(x_i - x_{i,nom})(x_j - x_{j,nom}) + \frac{1}{3!}\frac{\partial^3 s}{\partial^2 x_i \partial x_j}\bigg|_{x_{nom}} \quad (15)$$

$$(x_i - x_{i,nom})^2(x_j - x_{j,nom}) + \frac{1}{3!}\frac{\partial^3 s}{\partial x_i \partial^2 x_j}\bigg|_{x_{nom}}$$

$$(x_i - x_{i,nom})(x_j - x_{j,nom})^2 + \frac{1}{4!}\sum_{p=1;p+q=4}^{3}\frac{\partial^4 s}{\partial^p x_i \partial^q x_j}\bigg|_{x_{nom}}$$

$$(x_i - x_{i,nom})^p(x_j - x_{j,nom})^q \ldots + \frac{1}{M!}\sum_{p=1;p+q=M}^{M-1}\frac{\partial^M s}{\partial^p x_i \partial^q x_j}\bigg|_{x_{nom}}$$

$$(x_i - x_{i,nom})^p(x_j - x_{j,nom})^q + \ldots =$$

$$s(x_{ij}) - s(x_i) - s(x_j) + s(x_{nom}) \text{ where}$$

$$x_{ij}(k) = \begin{cases} x_{nom}(k), \text{ otherwise} \\ x_i, k = i \\ x_j, k = j \end{cases} \quad (16)$$

Therefore, s(x) can be written as $$s(x) = \quad (17)$$

$$\sum_{i=1}^{N}\sum_{j=i+1}^{N} s(x_{ij}) - (N-2)\sum_{i=1}^{N} s(x_i) + \left(\frac{1}{2}N^2 - \frac{3}{2}N + 1\right) \times s(x_{nom}) + e_2$$

where the $e_2$ represents the sum of higher-order mixed derivatives of more than two variables.

In examples, a table is constructed before applying inversion to compute a first term in Eq. (12) (i.e. $\Sigma_{i=1}^{N} s(x_i) - (N-1) \times s(x_{nom})$). This term captures all higher-order non-mixed derivatives, which may be derivative of only one variable). During inversion, a log is divided into individual zones, inversion zones, with constant properties such as number of pipes and pipe nominal thicknesses. Zones may also be selected based on other factors such as minimizing the variation of the pipe magnetic properties. A plurality of points that sample a given pipe property may be chosen such that the plurality of points capture linear and higher order variations of all channels to the given pipe property over the entire dynamic range of the given pipe property within a given inversion zone.

Figure 4:
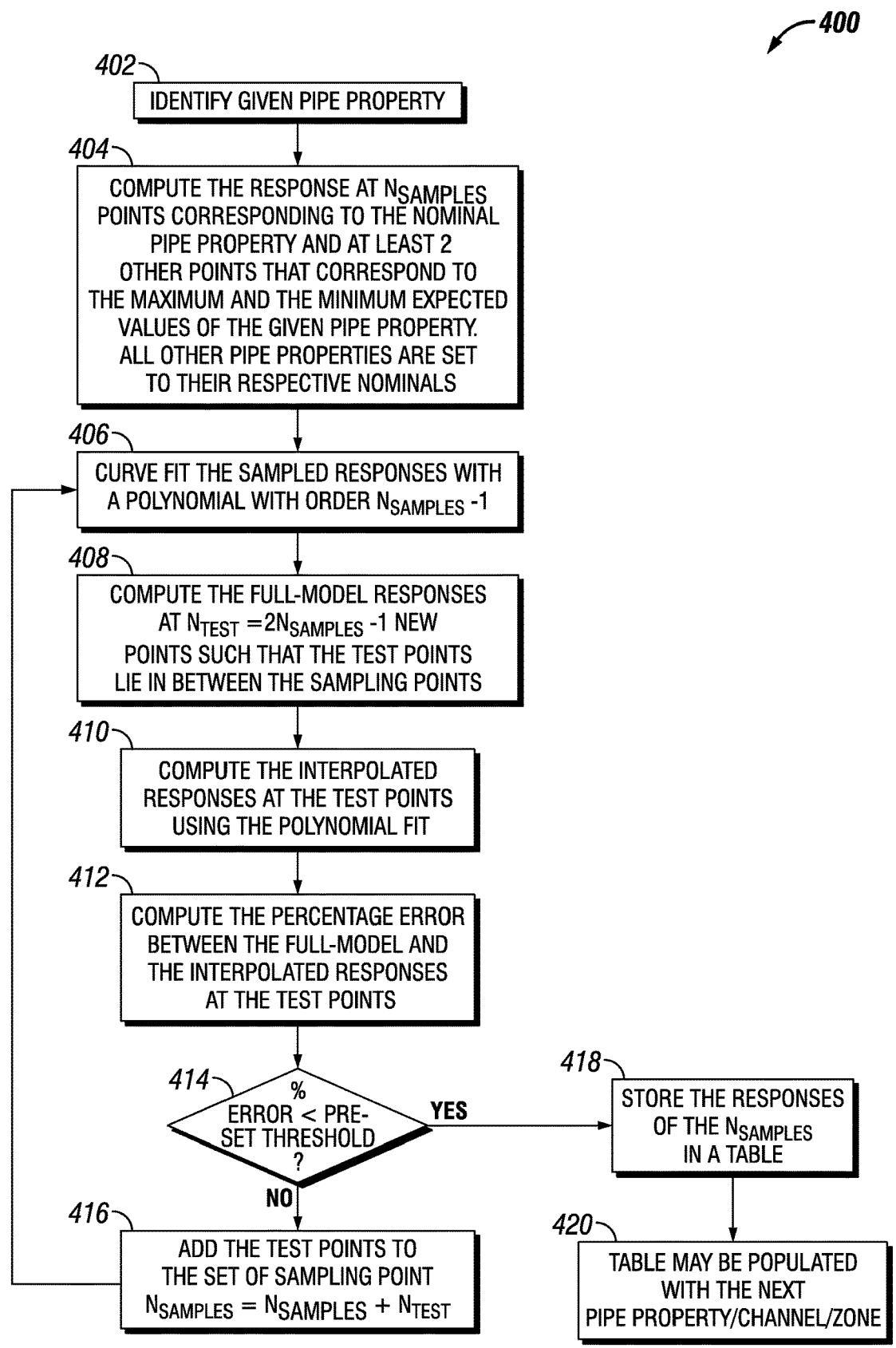
FIG. 4 illustrates a flow chart for building a pre-computed table of responses.
Figure 5A:
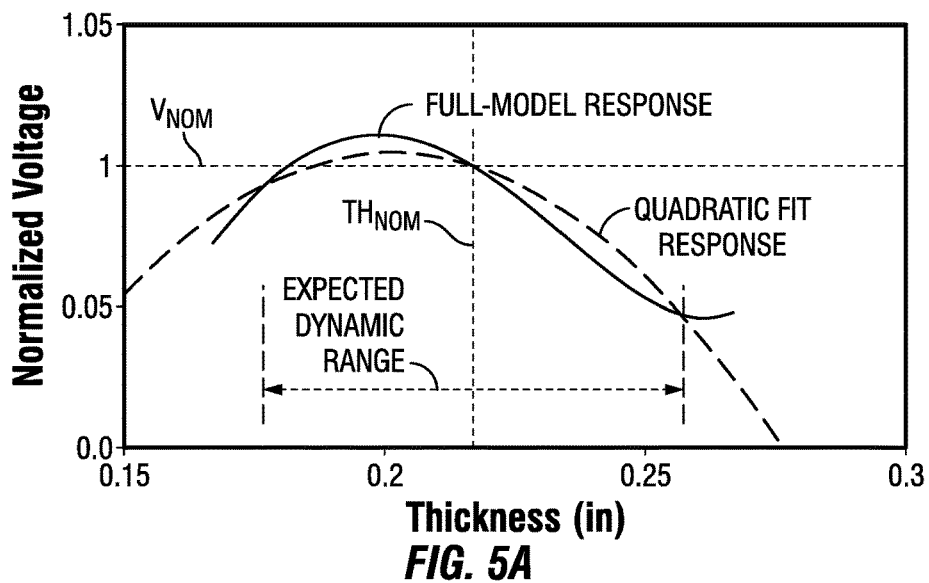
FIG. 5A is a graph illustrating certain steps of the flow chart shown on FIG. 4.

FIG. 4 illustrates a flowchart 400 for building a pre-computed table of responses. Flowchart 400 may begin with step 402 identify a given pipe property. For example, in step 402 an operator may choose a pipe property for inversion. Without limitations, pipe properties may be pipe thickness, pipe inner and outer diameters, pipe conductivity and pipe permeability. Once a pipe property has been chosen in step 402, in step 404 an operator may compute the responses at $N_{samples}$ points corresponding to the nominal pipe property and at least two other points that correspond to the maximum and the minimum expected values of the given pipe property with a forward model. All other pipe properties are set to their respective nominals. Once all responses are found, in step 406 the operator may curve fit the sampled responses with a polynomial with order $N_{samples}-1$ that best fits the sampled responses with respect to a certain criterion such as the minimum average square error between the polynomial and responses is found. This step is denoted as the curve fit stage. FIG. 5A is a graph that illustrates steps 404 and 406. For example, the operator may compute the responses corresponding to the nominal pipe property and two other points that correspond to the maximum and the minimum expected values of the given pipe property followed by computing a quadratic fit response.

Figure 5B:
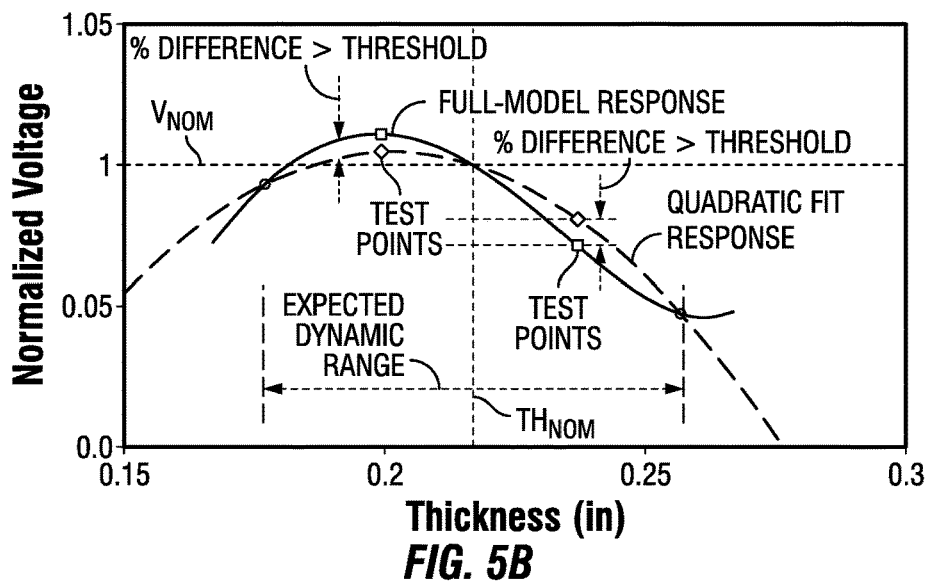
FIG. 5B is a graph illustrating certain steps of the flow chart shown on Figure.

After step 406, in step 408 an operator may compute the full-model response at $N_{test}=2N_{samples}-1$ new points such that the test points lie in between the sampling points. In step 410, the operator may then compute the interpolated response at the test points using the polynomial fit of step 406. From step 410, in step 412 an operator may compute the percentage error between a full-model and the interpolated response at the test points where the percentage error may be calculated as the absolute value of the ratio of the difference between interpolated response and the full model to the full model times a hundred. FIG. 5B is a graph illustrating the operation of steps 408, 410, 412, and 414 of flowchart 400. For example, two test points are chosen and then the operator computes the full-model responses at the test points and compared with the polynomial fit. As illustrated the percentage error is found to be higher than a pre-set threshold, which is step 414.

Figure 5C:
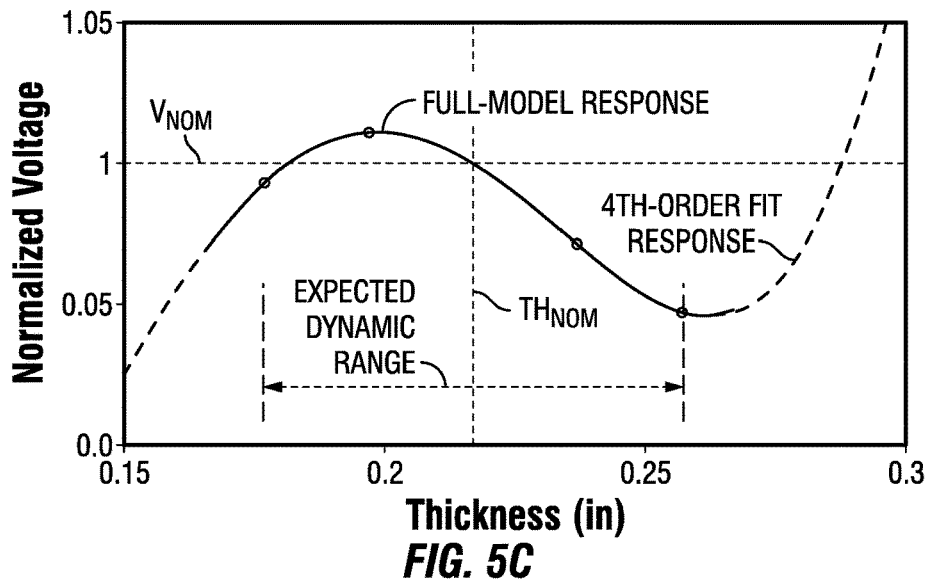
FIG. 5C is a graph illustrating certain steps of the flow chart shown on Figure.
Figure 5D:
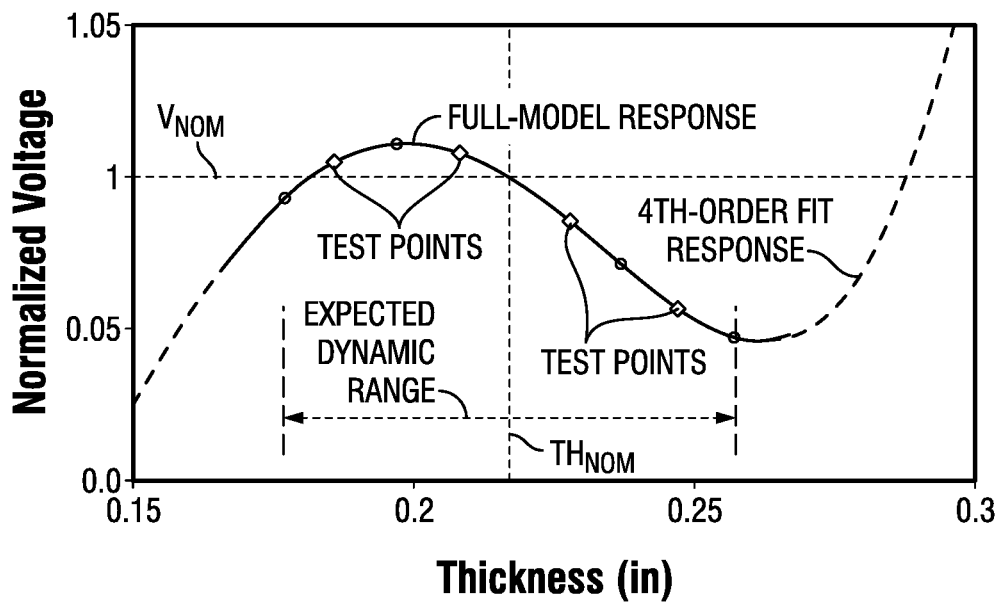
FIG. 5D is a graph illustrating certain steps of the flow chart shown on Figure.
Figure 5E:
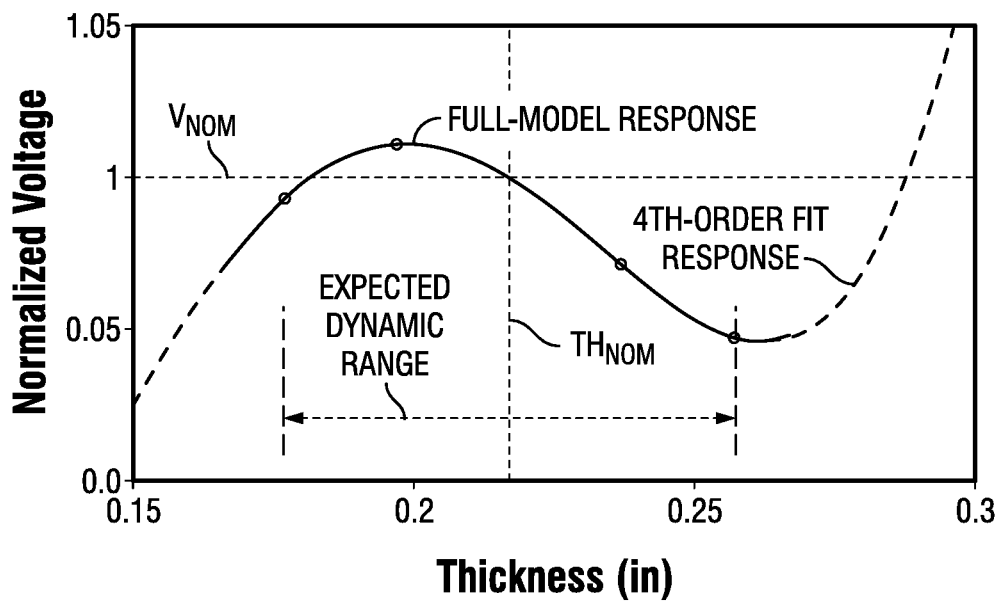
FIG. 5E is a graph illustrating certain steps of the flow chart shown on Figure.

In step 414 if the percentage error is more than the pre-set threshold then flowchart 400 moves to step 416 where on operator may add the test points to the set of sampling points $N_{samples}=N_{Samples}+N_{test}$. This pre-set threshold may be based on desired inversion accuracy and may be set at 1% as an example. The results may then be fed back to step 406 in a feedback loop. FIG. 5C is a graph illustrating the test points from FIG. 5B being added to the set of sampling points and a $4^{th}$ order fit is made. Steps 406 to 414 are repeated. FIG. 5D is a graph illustrating four chosen test points which may then be computed in a full-model responses at the four test points and compared with the polynomial fit. Thus, in step 414 if the percentage error is less than the pre-set threshold then flowchart 400 moves to step 418. In step 418, the operator may store the responses of the $N_{samples}$ in at table (e.g., Table 1). FIG. 5E is a graph that illustrates step 418 of workflow 400. Specifically, the graph in FIG. 5E illustrates the optimum number of samples chosen to be five. The responses corresponding to these samples may be stored in a table. In step 420, the table may be populated with the next pipe property, channel, and/or zone.

The computational cost for building the pre-computed table of responses is summarized in Table 1, seen below. Table 1 compares the disclosed higher-order non-mixed derivatives model with the linearized (gradient-based) model and the full model. Results in Table 1 assume equal number of samples is used for different pipe properties.

TABLE 1

| Table approximation | Linearized model | Higher-order non-mixed derivatives | Higher-order with mixed-derivatives | Full model |
|---|---|---|---|---|
| Number of simulation points per channel | N + 1 | $(N_{samples} - 1)N + 1$ | $C_N^2(N_{sample}^2 - 1) + 1$ | $N_{samples}^N$ |
| Example: N = 5, $N_{samples}$ = 5 | 6 | 21 | 241 | 3125 |
| Region of validity | Small variations in all pipe properties. | Large variation in one or more pipe properties as long as the mutual interaction (cross-coupling) between those properties can be neglected. | Large variation in one or more pipe properties and the mutual interaction between those properties are considered. | Large variation in any of the pipes properties. |

Figure 6:
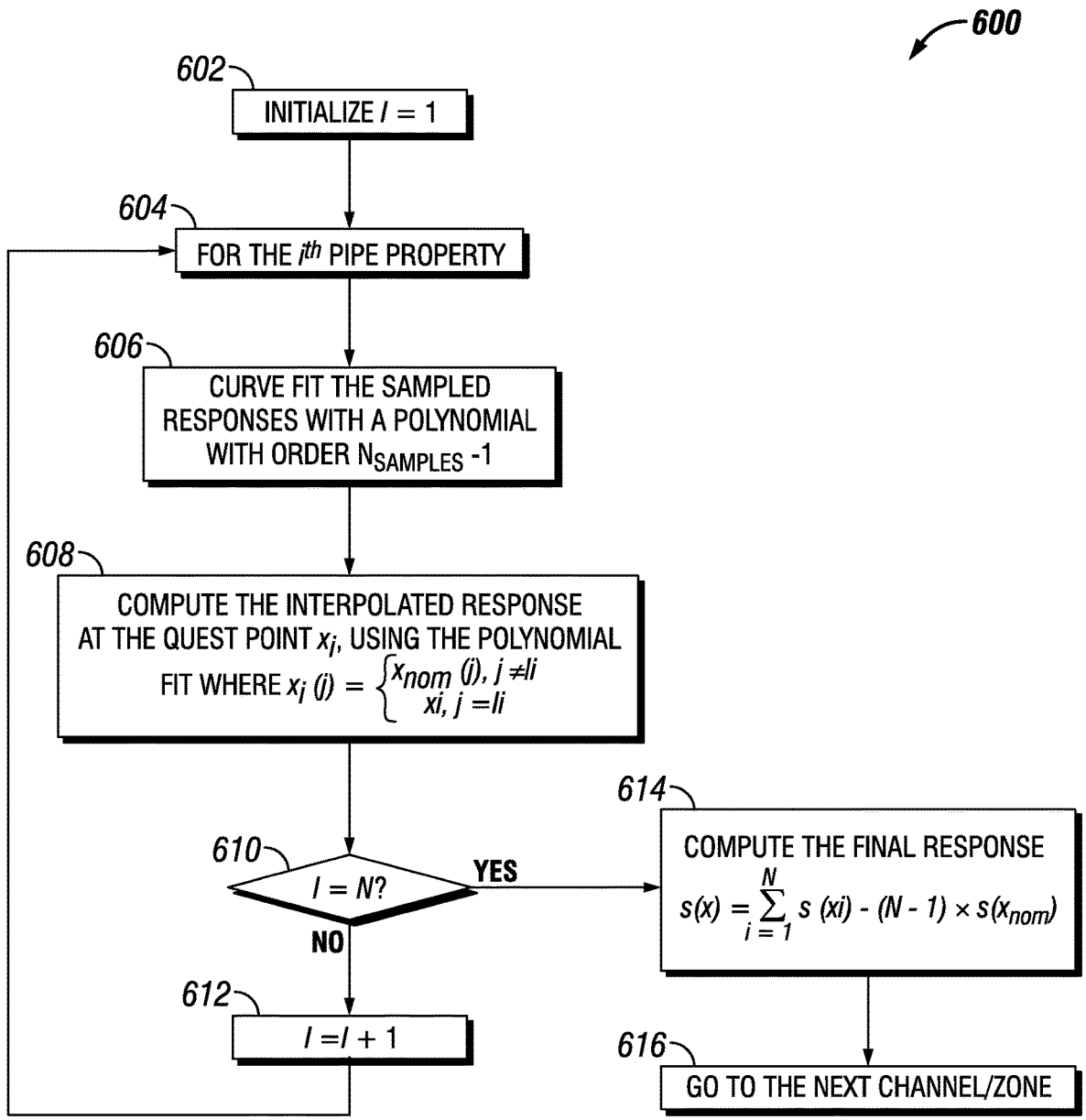
FIG. 6 illustrates a flow chart for looking-up a pre-computed table of responses.

In Table 1, $$C_N^2 = \frac{N(N-1)}{2} \quad (18)$$

is the total number of combinations of two variables from N variables. FIG. 6 illustrates workflow 600 for utilizing and operating a pre-computed table of responses. To begin workflow 600, step 602 may begin by initializing i=1, which may be defined as selecting a channel for EM logging tool 100. Next, in step 604 for the $i^{th}$ pipe property, an operator selected pipe property is chosen. Similar to flowchart 400 above, in step 606 the process may curve fit the sampled responses with a polynomial with order $N_{samples}$-1. In step 608, the operator may compute the interpolated response at the quest point $x_i$ using the polynomial fit, where:

$$x_{ij}(k) = \begin{cases} x_{nom}(j), & j \neq i \\ x_i, & j = i \end{cases} \quad (19)$$

In step 610, if i≠N then workflow 600 moves to step 612. In step 612 an update is performed by i=i+1. The results from step 612 is fed back to step 604 in a feedback loop. Thus, steps 604-610 are repeated with the updated information. At step 610 if i=N then workflow 600 moves to step 614. In step 614, the step may compute the final response of $$s(x) = \sum_{i=1}^{N} s(x_i) - (N-1) \times s(x_{nom}) \quad (20)$$

which may populate a table.

From step 614, in step 616 the table may be populated with the next channel and/or zone. The forward model disclosed above may account for non-linear variations in tool responses due to a large swing in one of the pipe properties away from its nominal value by incorporating higher-order non-mixed derivatives in the pre-computed table.

As discussed above, improvements to current technology are that an inversion based on the forward model disclosed in this invention will ensure accurate estimation of features with large swings from nominals such as collars and deep defects. Additionally, the forward model disclosed above may ensure that all non-noisy channels are incorporated in the inversion without having the channels exhibiting high non-linearity which breaks a linearized model assumption. Additionally, the method for building the pre-computed table disclosed above provides an error control by increasing the number of sampling points in steps and checking for the error between the full-model and the interpolation-based (fast) model after each step. Thus, the fast forward model disclosed is more accurate than the linearized model and faster to compute than a full model. It will improve performance by removing the need to investigate channels to discard those that break the linearized model.

By determining the difference between collars and deep defects, such as set in corrosion, thinning pipe thickness, and/or the like the operator may be able to determine the exact location within a pipe string, or casing, where a well operation may be performed in response to the identified feature, such as corrosion. In examples, any suitable well operation may be performed to address the corrosion in Response to the identified feature, including, but not limited to, chemical treatments, among others. Well operations may involve replacing, fixing, or adding casing string, tubing, collars, filters, packers, and/or the like. In examples, an operator may spot treat corrosion by removing the corrosion and adding protective coatings to the affected area. This may prevent the loss of production fluids, chemicals, and/or the like into the formation.

This method and system may include any of the various features of the compositions, methods, and system disclosed herein, including one or more of the following statements.

Statement 1. A method for estimating a pipe property for a plurality of nested pipes may comprise disposing an electromagnetic logging tool in a wellbore. The electromagnetic logging tool may comprise a transmitter, wherein the transmitter is a first coil, and, a receiver, wherein the receiver is a second coil. The method may further comprise transmitting an electromagnetic field from the transmitter into a pipe string; energizing the pipe string with the electromagnetic field to produce an eddy current in the pipe string; measuring the eddy current in the pipe string with the receiver on at least one channel to obtain a plurality of measurement; determining the pipe property from the plurality of measurements, wherein the pipe property identifies a feature in the wellbore; forming a pre-computed table of responses for the at least one channel comprising a plurality of points that sample the pipe property; and performing a model-based inversion to estimate the pipe property using the plurality of measurements, the nominal properties of the pipes, and a fast forward model based on the pre-computed table of responses.

Statement 2. The method of statement 1, wherein the plurality of measurements are multi-frequency and multi-spacing and the electromagnetic logging tool is a frequency-domain tool.

Statement 3. The method of statement 1, wherein the electromagnetic logging tool is a time-domain tool further comprising a plurality of receivers with a plurality of sizes.

Statement 4. The method of statements 1 to 3, further comprising measuring the electromagnetic field with the transmitter, wherein the transmitter acts as the receiver for the measuring the electromagnetic field.

Statement 5. The method of statements 1 to 4, wherein the pipe property includes a thickness, a percentage metal loss or gain, a magnetic permeability, an electrical conductivity, a total thickness, an eccentricity, an inner diameter, an outer diameter, or an ovality of each pipe.

Statement 6. The method of statements 1 to 5, wherein determining the pipe property is found from a well plan.

Statement 7. The method of statements 1 to 6, wherein determining the pipe property is estimated in a pre-inversion step and wherein the pre-inversion step is a permeability estimation step or a conductivity estimation step.

Statement 8. The method of statements 1 to 7, wherein the fast forward model is computed using an interpolation and a linear combination of the plurality of measurements in the pre-computed table and higher-order non-mixed derivatives.

Statement 9. The method of statements 1 to 8, wherein the performing a model-based inversion further comprises inverting the pipe property in at least one inversion zone, wherein number of pipes, their individual weights, and their individual inner diameters are invariant in the inversion zone.

Statement 10. The method of statements 1 to 9, wherein the plurality of points that sample a given pipe property are chosen such that they capture linear and higher order variations of all channels to the given pipe property over an entire dynamic range of the given pipe property within a given inversion zone.

Statement 11. The method of statements 1 to 10, further comprising performing a well operation in response to the feature identified in a wellbore at least partially by the pre-computed table of responses.

Statement 12. The method of statements 1 to 11, wherein sampling points that sample a given pipe property comprise the nominal pipe property and at least one other point.

Statement 13. The method of statements 1 to 12, wherein number of sampling points is increased in steps until linear and higher order variations of a given channel to a given pipe property over an entire dynamic range of the given pipe property within a given inversion zone is captured and wherein the number of sampling points are different for different pipe properties and different channels.

Statement 14. The method of statements 1 to 13, wherein the pre-computed table of responses is computed for a first subset of channels, and a full forward model is evoked within the model-based inversion for a second subset of channels.

Statement 15. The method of statements 1 to 14, wherein the first subset of channels comprises channels with negligible sensitivity to cross-couplings between different pipe properties, whereas the second subset of channels comprises channels with non-negligible sensitivity to cross-couplings between different pipe properties.

Statement 16. A system for estimating a pipe property for a plurality of nested pipes may comprise an electromagnetic logging tool. The electromagnetic logging tool may comprise a transmitter, wherein the transmitter is a first coil and is operable to transmit an electromagnetic field, and a receiver, wherein the receiver is a second coil and is operable to measure the electromagnetic field and wherein the transmitter and receiver are separated by about one inch to about two hundred inches. The electromagnetic logging tool may further comprise an information handling system configured to form a pre-computed table of responses for the at least one channel comprising a plurality of points that sample each one of pipe properties for a plurality of pipes and perform a model-based inversion to estimate a set of pipe properties, the nominal properties of the pipes, and a fast forward model based on the pre-computed table of responses.

Statement 17. The system of statement 16, wherein the information handling system is further configured to estimate a pre-inversion step to determine an initial pipe property and wherein the pre-inversion step is a permeability estimation step or a conductivity estimation step.

Statement 18. The system of statements 16 or 17, wherein the fast forward model is computed using an interpolation and a linear combination of the measurements in the pre-computed table of responses and higher-order non-mixed derivatives.

Statement 19. The system of statements 16 to 18, wherein the information handling system is further configured to invert the pipe properties in at least one inversion zone, wherein number of the pipes, their individual weights, and their individual inner diameters are invariant in the inversion zone.

Statement 20. The system of statements 16 to 9, wherein the plurality of points that sample a given pipe property are chosen such that they capture linear and higher order variations of all channels to the given pipe property over an entire dynamic range of the given pipe property within a given inversion zone.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a pipe property for a plurality of nested pipes comprising:
   disposing an electromagnetic logging tool in a wellbore, wherein the electromagnetic logging tool comprises:
      a transmitter, wherein the transmitter is a first coil; and
      a receiver, wherein the receiver is a second coil;
   transmitting an electromagnetic field from the transmitter into a pipe string;
   energizing the pipe string with the electromagnetic field to produce an eddy current in the pipe string;
   measuring the eddy current in the pipe string with the receiver on at least one channel to obtain a plurality of measurement;
   determining the pipe property from the plurality of measurements, wherein the pipe property identifies a feature in the wellbore;
   forming a pre-computed table of responses for the at least one channel comprising a plurality of points that sample the pipe property and a minimum or a maximum expected value of the pipe property for each response; and
   performing a model-based inversion to estimate the pipe property using the plurality of measurements, a plurality of nominal properties of the pipes, and a fast forward model based on the pre-computed table of responses.

2. The method of claim 1, wherein the plurality of measurements are multi-frequency and multi-spacing and the electromagnetic logging tool is a frequency-domain tool.

3. The method of claim 1, wherein the electromagnetic logging tool is a time-domain tool further comprising a plurality of receivers with a plurality of sizes.

4. The method of claim 1, further comprising measuring the electromagnetic field with the transmitter, wherein the transmitter acts as the receiver for the measuring the electromagnetic field.

5. The method of claim 1, wherein the pipe property includes a thickness, a percentage metal loss or gain, a magnetic permeability, an electrical conductivity, a total thickness, an eccentricity, an inner diameter, an outer diameter, or an ovality of each pipe.

6. The method of claim 1, wherein determining the pipe property is found from a well plan.

7. The method of claim 1, wherein determining the pipe property is estimated in a pre-inversion step and wherein the pre-inversion step is a permeability estimation step or a conductivity estimation step.

8. The method of claim 1, wherein the fast forward model is computed using an interpolation and a linear combination of the plurality of measurements in the pre-computed table and higher-order non-mixed derivatives.

9. The method of claim 1, wherein the performing a model-based inversion further comprises inverting the pipe property in at least one inversion zone, wherein number of pipes, their individual weights, and their individual inner diameters are invariant in the inversion zone.

10. The method of claim 9, wherein the plurality of points that sample a given pipe property are chosen such that they capture linear and higher order variations of all channels to the given pipe property over an entire dynamic range of the given pipe property within a given inversion zone.

11. The method of claim 10, wherein sampling points that sample a given pipe property comprise the nominal pipe property and at least one other point.

12. The method of claim 10, wherein number of sampling points is increased in steps until linear and higher order variations of a given channel to a given pipe property over an entire dynamic range of the given pipe property within a given inversion zone is captured and wherein the number of sampling points are different for different pipe properties and different channels.

13. The method of claim 1, wherein the pre-computed table of responses is computed for a first subset of channels, and a full forward model is evoked within the model-based inversion for a second subset of channels.

14. The method of claim 13, wherein the first subset of channels comprises channels with negligible sensitivity to cross-couplings between different pipe properties, whereas the second subset of channels comprises channels with non-negligible sensitivity to cross-couplings between different pipe properties.

15. The method of claim 1, further comprising performing a well operation in response to the feature identified in a wellbore at least partially by the pre-computed table of responses.

16. A system for estimating a pipe property for a plurality of nested pipes comprising:
   an electromagnetic logging tool, wherein the electromagnetic logging tool comprises:
      a transmitter, wherein the transmitter is a first coil and is operable to transmit an electromagnetic field;
      a receiver, wherein the receiver is a second coil and is operable to measure the electromagnetic field and wherein the transmitter and receiver are separated from one inch to about two hundred inches; and
   an information handling system configured to:
      form a pre-computed table of responses for the at least one channel comprising a plurality of points that sample each one of pipe properties for a plurality of pipes and a minimum or a maximum expected value of the pipe property; and
      perform a model-based inversion to estimate a set of pipe properties, a plurality of nominal properties of the pipes, and a fast forward model based on the pre-computed table of responses.

17. The system of claim 16, wherein the information handling system is further configured to estimate a pre-inversion step to determine an initial pipe property and wherein the pre-inversion step is a permeability estimation step or a conductivity estimation step.

18. The system of claim 16, wherein the fast forward model is computed using an interpolation and a linear combination of the measurements in the pre-computed table of responses and higher-order non-mixed derivatives.

19. The system of claim 16, wherein the information handling system is further configured to invert the pipe properties in at least one inversion zone, wherein number of the pipes, their individual weights, and their individual inner diameters are invariant in the inversion zone.

20. The system of claim 19, wherein the plurality of points that sample a given pipe property are chosen such that they capture linear and higher order variations of all channels to the given pipe property over an entire dynamic range of the given pipe property within a given inversion zone.

* * * * *